United States Patent
Austin et al.

(10) Patent No.: US 8,717,506 B2
(45) Date of Patent: May 6, 2014

(54) ELECTRONIC VIDEO DISPLAY MOUNT

(75) Inventors: Pete Austin, Spring, TX (US); Tony O. Anuez, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 13/187,281

(22) Filed: Jul. 20, 2011

(65) Prior Publication Data

US 2013/0021539 A1    Jan. 24, 2013

(51) Int. Cl.
*H04N 5/64* (2006.01)

(52) U.S. Cl.
USPC .......................................................... 348/836

(58) Field of Classification Search
None
See application file for complete search history.

(56) References Cited

U.S. PATENT DOCUMENTS

| | | | |
|---|---|---|---|
| D299,241 S | 1/1989 | Hoshino et al. | |
| 5,772,174 A | 6/1998 | Hirsch et al. | |
| D418,525 S | 1/2000 | Watson et al. | |
| 6,896,380 B2 | 5/2005 | McPherson et al. | |
| 7,175,291 B1 | 2/2007 | Li | |
| 7,287,731 B2 | 10/2007 | Johnson | |
| 7,556,431 B2 | 7/2009 | Chen | |
| 7,794,029 B2 | 9/2010 | Peng et al. | |
| 2005/0040299 A1* | 2/2005 | Twyford | 248/177.1 |
| 2006/0158836 A1* | 7/2006 | Phillips | 361/681 |
| 2009/0133609 A1* | 5/2009 | Nethken et al. | 108/50.02 |
| 2011/0019344 A1 | 1/2011 | Russell et al. | |

FOREIGN PATENT DOCUMENTS

WO    WO 2010/013176 A1    2/2010

OTHER PUBLICATIONS

Sallas Industrial Co., Ltd., "Pole mount LCD monitor arm," Model No. 60212P Series, www.allproducts.com/showcase/sallas/Product-2005331215842.html, 1996-2011(2 pages).
Philips—LCD Wall Mount Tilting—SQM6485/00, www.philips.co.in/c/tv-and-monitor-accessories/tilting-sgm6485_00/prd/;jsessionid, 2004-2011 (2 pages).
Discount TV Wall Mounts, "Peerless PF660 Fixed Wall Mount," www.flattvwallmounts.blogspot.com/2009/11/peerless-pf660-fixed-wall-mount-for-37.html, Nov. 2009 (2 pages).
AFC Industries, Inc., "PedPoleArm," Spec sheet retrieved from http://www.afcindustries.com/twin_monitor_pedestal.htm, Apr. 2006 (1 page).
Right Display Systems, "FD151SMT 15" LCD and Slide Mount, Installation and Operation Manual, Apr. 2006 (15 pages).
AFC Public Safetyl, "Flat Panel Monitor Holder AFCRAIL01-W14," www.afcpublicsafety.com/getvla/prodView.asp?idproduct=483, 2011 (1 page).
VESA Flat Display Mounting Interface (FDMI) Overview, retrieved from www.vesa.org/wp-content/uploads/2010/12/FDMI-Overview.pdf, Dec. 2010 (3 pages).

* cited by examiner

*Primary Examiner* — Dave Czekaj
*Assistant Examiner* — Mohammad J Rahman

(57) ABSTRACT

An electronic video display mount includes a substantially vertical mounting pole rigidly attached to a pole foot; and a mounting collar releasably fixed to a mounting location that is selectively defined between a minimum distance and a maximum distance from the pole foot on the pole. The mount also includes a substantially horizontally mounted linear slide assembly fixedly attached to the mounting collar at an attachment interface, and a Video Electronics Standards Association (VESA) mount pivotally attached to the linear slide assembly.

18 Claims, 5 Drawing Sheets

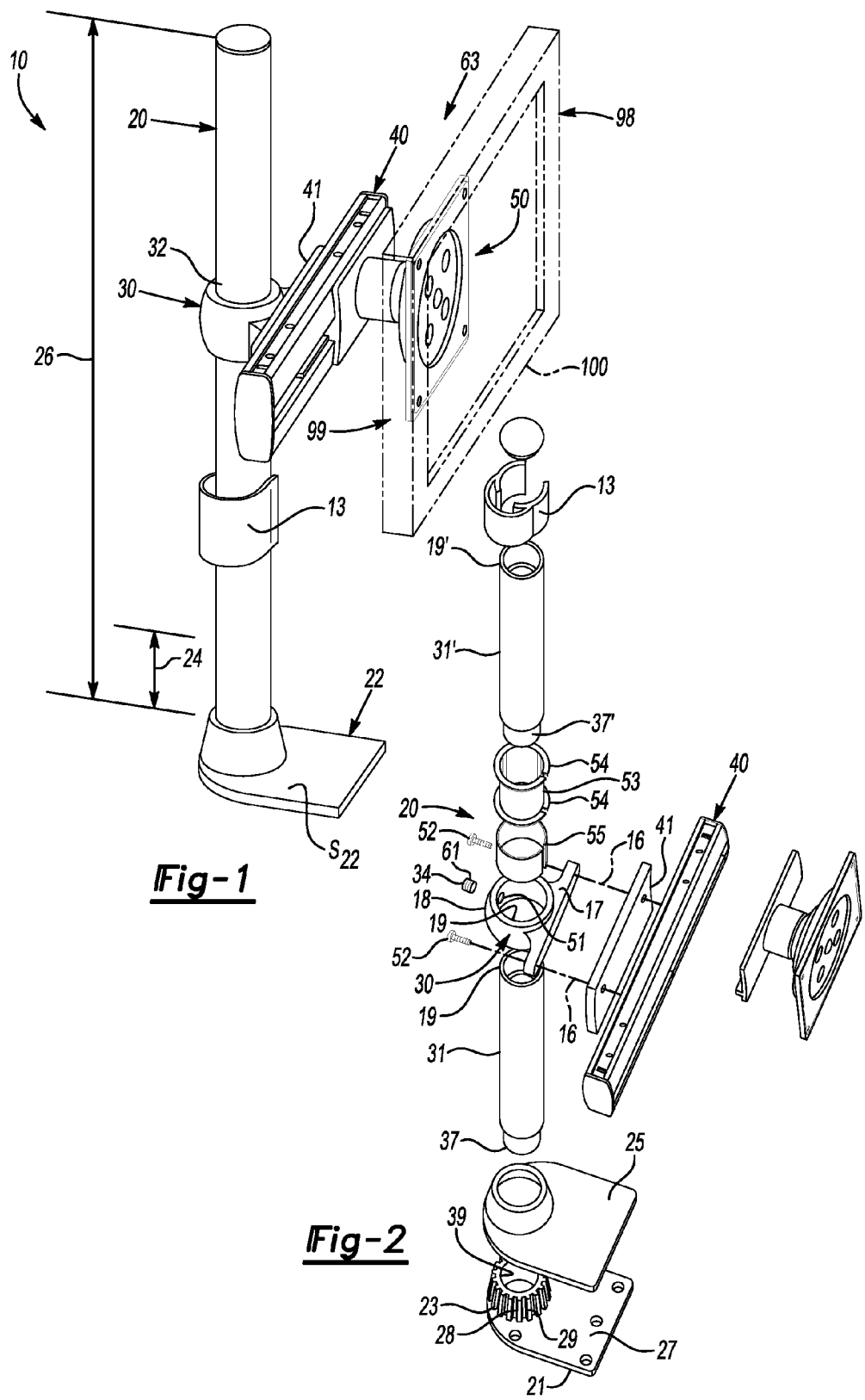

ELECTRONIC VIDEO DISPLAY MOUNT

BACKGROUND

The present disclosure relates generally to electronic video display mounts.

Some electronic video display mounts are included in retail point-of-sale terminals. Retail point-of-sale terminals are computer terminals located where purchasers perform financial transactions in exchange for services or possession of goods at a business. For example, retail point-of-sale terminals may be found at grocery stores, department stores, shoe stores and hardware stores in the "check-out" aisles. Retail point-of-sale terminals may include keyboards, scanners, base terminals and electronic video displays. When included, the video displays may be mounted on articulating arms to allow adjustment of the position of the video display. Some of the electronic video displays include touch screens. Use of the touch screens may result in noticeable instability of the display related to the mounting arrangement. For example, the display may wobble when the touch screen is touched.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a ¾ perspective view depicting an example of an electronic video display mount as disclosed herein;

FIG. 2 is a partially exploded perspective view showing components of the example depicted in FIG. 1;

DETAILED DESCRIPTION

Figure 3:
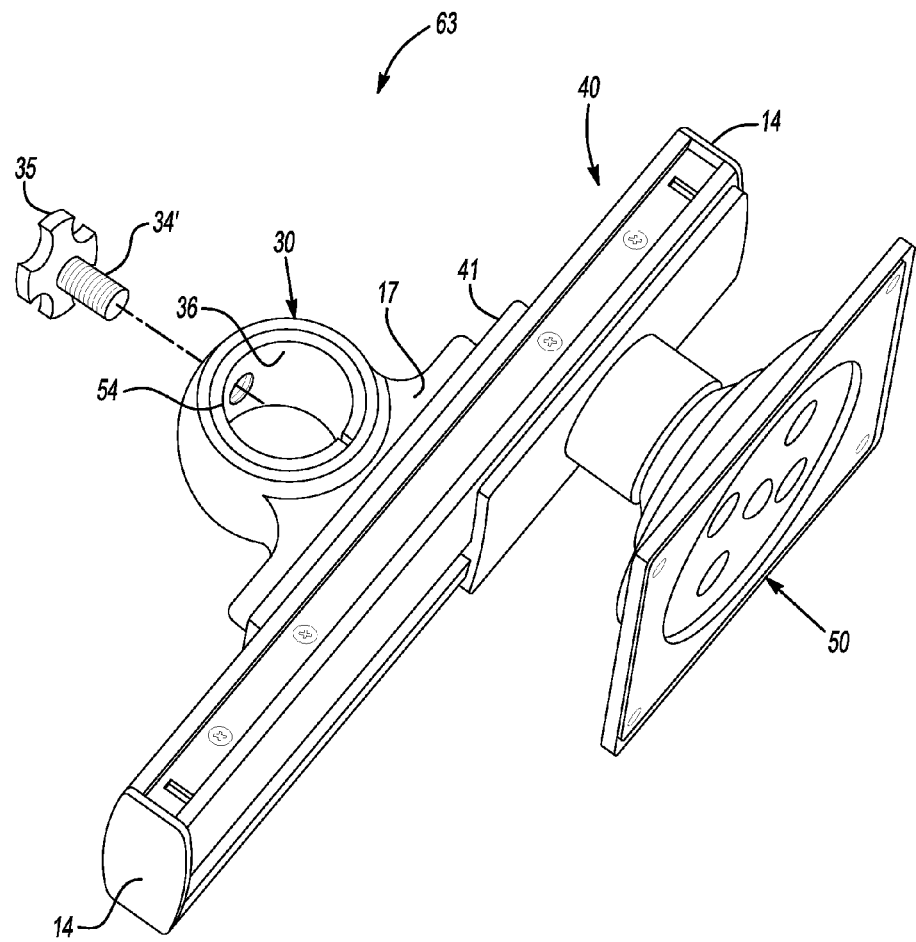
FIG. 3 is an enlarged, partially exploded perspective view depicting an example of the display arm assembly shown in FIG. 1.

Example(s) of the electronic video display mount as disclosed herein may be incorporated into a retail point-of-sale terminal. Some retail point-of-sale terminals include keyboards, scanners, base terminals and electronic video displays. The video displays may be mounted on articulating arms, which may be adjusted in order to position the video display in a desirable manner. Some of the electronic video displays include touch screens. When touch screen displays are mounted, use of the touch screens may result in undesirable movement of the display. This undesirable movement may be illustrative of the instability of the display relative to the mounting arrangement. For example, when a user pushes on some touch screens, the pushing force causes the display to shake or wobble.

Typical general purpose display mounts may be used for a computer monitor at a workstation, or to mount a flat screen TV. These general purpose display mounts may provide the user with a large amount of positional adjustability for the display, however the stability of the display generally decreases with increased adjustability. Since TVs and computer monitors without touch screens are generally not touched during use, the user may not notice the instability of such a display in/on the mount. The display mount disclosed herein provides a limited but appropriate amount of adjustment without compromising the stability of the display.

Typical point-of-sale displays may be mounted rigidly to a base having no adjustment, or the displays may be deployed on an articulating swing arm that provides side-to-side adjustment. When the articulating swing arm is utilized, stability may be enhanced by locking the articulating joints with clamps, screws, and pins that are manipulated to allow adjustment. The side-to-side movement of a swing arm display mount is typically through an arc, which causes the display to move closer to the user in the middle of the arc of travel. Such fore-aft movement of the display may interfere with peripherals which may include, for example, keyboards and scanners disposed on the point-of-sale base terminal.

The linear slide assembly included in the display arm disclosed herein provides for side-to-side adjustment of the display. The disclosed mechanism provides for smooth continuous sliding movement without the use of locking levers, cams, or screws. The display can be moved side-to-side on the display arm by pushing the sides of the display.

The disclosed display mount provides for initial setup adjustment flexibility on a retail point-of-sale terminal. The initial setup is positionally secured by screws that maintain stability of the system. The disclosed display mount has limited but appropriate adjustability for the user to fine-tune the display's side-to-side position. A touch screen display's optimal front to rear position is, ergonomically, a fixed distance from the user and is based on a factor of average adult human arm length. Front to rear adjustment is optimized and fixed at a predetermined position. Vertical and side-to-side adjustment are desirable, but generally require a limited range of movement. The electronic video display mount disclosed herein provides such optimal but limited adjustability, and as a result, is able to maintain a high level of stability that improves satisfaction with using touch screen displays.

FIG. 1 depicts an example of an electronic video display mount 10 as disclosed herein. The electronic video display mount 10 includes a substantially vertical mounting pole 20 rigidly attached to a pole foot 22. By "substantially vertical", it is meant that the mounting pole 20 has a center axis (not shown) that is parallel to or within about 10 degrees of a line that is perpendicular to the top surface $S_{22}$ of the pole foot 22. In one example, the substantially vertical mounting pole 20 may be about 1 meter long and have a round cross-section that ranges from about 3.5 cm to about 5 cm in diameter. It is to be understood, however, that the pole 20 may be any suitable length, and that the cross-section of the pole 20 may have any shape including, for example, a square, a rectangle, an oval, a triangle, another regular or non-regular geometric shape, and combinations thereof. The substantially vertical mounting pole 20 may be formed of steel, aluminum, aluminum alloys, wood, plastic, plastic composites, and combinations thereof.

The pole foot 22 may be anchored to a substantially rigid base structure (not shown), for example, a Retail Point Of Sale Terminal Base, a cart, or a countertop. A mounting collar 30 is releasably fixed to a mounting location 32 that is selectively defined between a minimum distance 24 and a maximum distance 26 from the pole foot 22 on the pole 20. In an example, the minimum distance is about 20 cm and the maximum distance is about 85 cm. A substantially horizontally-mounted linear slide assembly 40 is fixedly attached to the mounting collar 30 at an attachment interface 41. As used herein, the term "substantially horizontal" or the like means parallel to or within about 10 degrees of horizontal. The linear slide assembly 40 is substantially horizontally mounted when translation of a carriage assembly 60 portion (see FIG. 7) of the linear slide assembly 40 is substantially horizontal.

A VESA mount 50 is pivotally attached to the linear slide assembly 40. A VESA mount 50 is a mount for a flat panel display that is compliant with the Video Electronics Standards Association (VESA) Flat Display Mounting Interface (FDMI) standard. An example of a VESA mount 50 is the original VESA mount (MIS-D), which includes four screws arranged at the corners of a 100 mm square pattern. The FDMI standard has different arrangements and fasteners for different sized displays. Any of these VESA mounts 50 may be used in the examples disclosed herein.

As depicted in FIG. 1, a cable guide 13 or cable conduit (not shown) may be disposed on the pole 20 to keep computer and power cables (not shown) neatly routed substantially along the pole 20. It is also contemplated that cables may be disposed within the pole 20 if the pole 20 is hollow.

Referring now to FIG. 2, the pole foot 22 may include a rigid base 21 covered by a decorative or aesthetically pleasing foot cover 25. The rigid base 21 has a tubular section 28 rigidly disposed on a base plate 27 with gussets 29 disposed to strengthen a joint 23 between the tubular section 28 and the base plate 27.

The substantially vertical mounting pole 20 has a first pole section 31. While a single pole section 31 is shown in FIG. 2, it is to be understood that the first pole section 31 may include multiple sections that matingly engage one another. A male end 37 of the first pole section 31 is matingly engaged with a female end/aspect 39 of the tubular section 28. The first pole section 31 includes a female end 19 distal to the male end 37. The substantially vertical mounting pole 20 also includes a second pole section 31' that is substantially identical to the first pole section 31. Again, while a single pole section 31' is shown, it is to be understood that the second pole section 31' may include multiple sections that matingly engage one another. The second pole section 31' includes a male end 37' and a female end 19'. As such, the respective ends 19, 19' and 37, 37' of the pole sections 31, 31' are substantially identical. The second pole section 31' may be coupled to the first pole section 31 by engaging the male end 37' of second pole section 31' with the female end 19 of the first pole section 31.

In the example shown in FIG. 2, the second pole section 31' coupled to the first pole section 31 together may form the substantially vertical mounting pole 20. The substantially vertical mounting pole 20 has a substantially continuous outer surface without ridges that would interfere with the smooth translation of the mounting collar 30 along the mounting pole 20 in the vertical direction, including across a joint between the first pole section 31 and the second pole section 31'. It is to be understood that a separate connector (not shown) may be used to join the pole sections 31, 31' together, and to join the first pole section 31 with the tubular section 28.

The mounting collar 30 includes an annulus 18 sized to receive the substantially vertical mounting pole 20, and a bracket 17 disposed substantially parallel to a plane of the annulus 18. The bracket 17 includes a plurality of through-holes 16 arranged in a complementary pattern with one of a plurality of discrete sets of attachment holes 46 (see FIG. 5) disposed on the linear slide assembly 40. The attachment interface 41 may be a flange disposed between the bracket 17 and the linear slide assembly 40 such that relative motion between the linear slide assembly 40 and the bracket 17 is substantially prevented. The attachment interface 41 may be integrally formed with the bracket 17, e.g., the two pieces 17 and 41 are molded together. In another example, the attachment interface 41 may be bonded to the bracket 17 (e.g., with adhesive) or secured to the bracket 17 with fasteners (not shown). The discrete sets of attachment holes 46 may be arranged in substantially identical patterns (e.g., along the width of the linear slide assembly 40), thereby providing selectable locations for the attachment interface 41. Respective screws 52 may be inserted through the through-holes 16 and threaded into one of the plurality of discrete sets of attachment holes 46 in the linear slide assembly 40, thereby fixedly attaching the mounting collar 30 at the attachment interface 41.

Still referring to FIG. 2, the mounting collar 30 may include an annular bushing 53 disposed within the annulus 18. The annular bushing 53 includes annular flanges 54 disposed at opposed ends of the annular bushing 53. The annular flanges 54 may be in circumferential contact with the annulus 18. The mounting collar 30 may further include a band 55 circumferentially wound in a single layer around the bushing 53 between the annular flanges 54 to substantially fill any radial gaps between the annulus 18 and the annular bushing 53.

A screw 34 (or 34' as shown in FIG. 3) may be disposed in a threaded aperture 51 to cause a clamping force between the mounting collar 30 and the mounting pole 20. The clamping force may be sufficient to prevent movement of the mounting collar 30 relative to the mounting pole 20 during normal use of the touch screen display that may be attached to the electronic video display mount 10. As such, the mounting collar 30 is releasably fixed by the screw 34, 34' to the mounting location 32. It is to be understood that the screw 34, 34' may be a set screw, a thumb screw, or any other form of screw that may be installed in the threaded aperture 51 and tightened. The screw 34, 34' may be tightened with a separate tool, or an integrated tool. Some examples of screws 34, 34' as disclosed herein are a hex socket set screw 61, a thumb screw (not shown), and a screw 34' with a knob 35 on a non-threaded end (e.g., see FIG. 3). The screw 34' with the knob 35 is an example of an integrated tool. A hex socket set screw 61 that is tightened with a hex wrench is an example of a screw 34 that may be tightened with a separate tool.

FIG. 3 depicts an enlarged view of the display arm assembly 63 shown in FIG. 1. The display arm assembly 63 includes the mounting collar 30 attached to the linear slide assembly 40 at the attachment interface 41. The display arm assembly 63 further includes the VESA mount 50 pivotally attached to the linear slide assembly 40.

Figure 4:
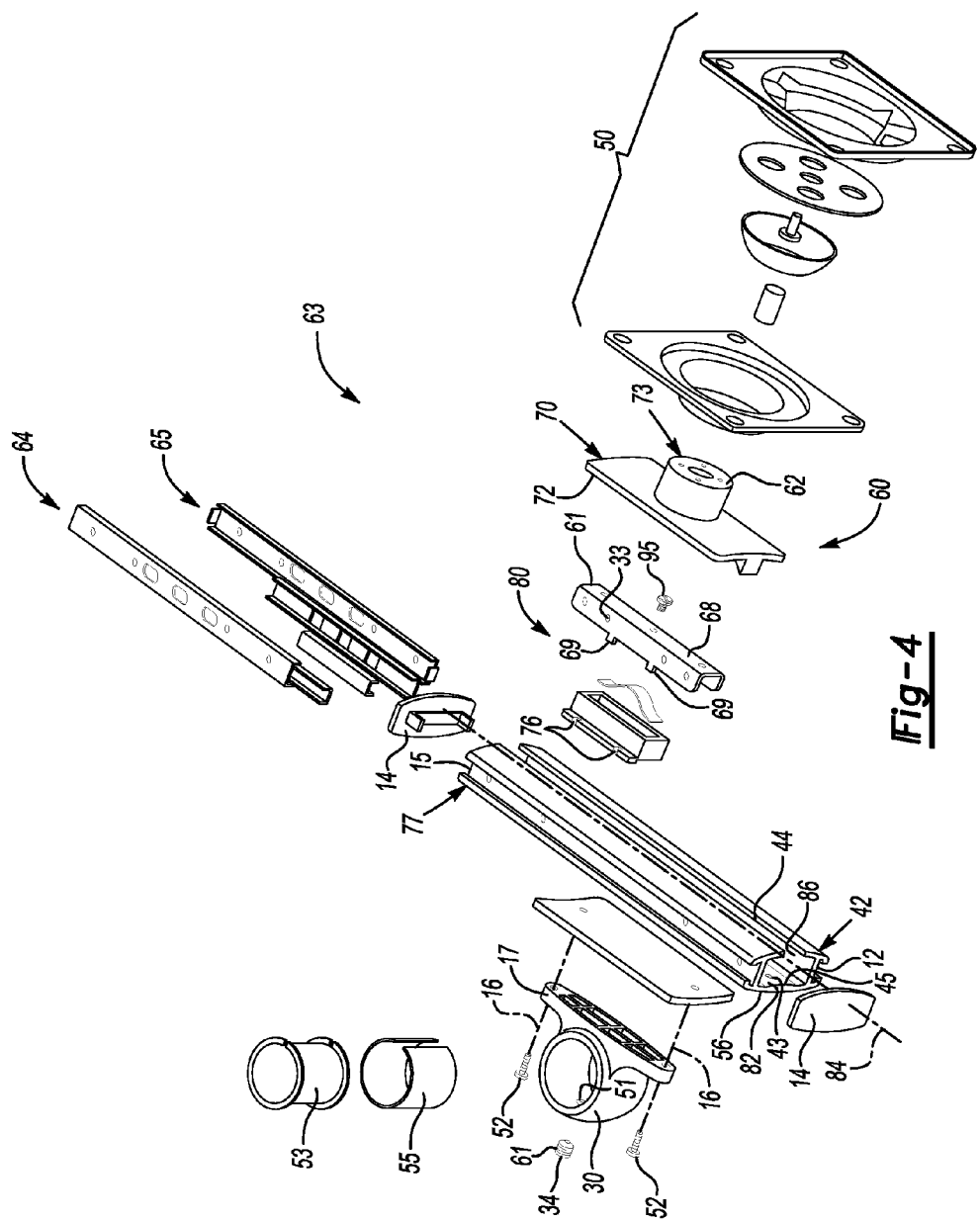
FIG. 4 is an exploded perspective view showing components of the example of the display arm assembly depicted in FIG. 3.

FIG. 4 is an exploded view showing more detail of the example of the display arm assembly 63 depicted in FIG. 3. An extrusion 42 has walls 77 that are substantially defined by a cross-section projected along a longitudinal axis 84. An interior cavity 82 is defined by the walls 77. In one example, the interior cavity 82 has a substantially rectangular cross-sectional shape although other cross-sectional shapes are contemplated. As illustrated in FIG. 4, the walls 77 may have some curve and may also have a substantially longitudinal axial slot 44 defined therein. A substantially longitudinal brake rail 45 is fixedly disposed on an interior surface 86 of the extrusion 42. Threaded holes 43 are defined in the walls 77 and are part of the discreet sets of attachment holes 46. The threaded holes 43 are utilized for attachment of the mounting collar 30 to the extrusion 42 of the linear slide assembly 40. The substantially longitudinal axial slot 44 is defined in the walls 77 parallel to the longitudinal axis 84 and opposite the threaded holes 43. As used herein, substantially longitudinal means within 5 degrees of a line parallel to the longitudinal axis 84. The extrusion 42 includes a first end 12 of a longest longitudinal wall 56 and a second end 15 that is distal to the first end 12. An end cap 14 may be disposed in each end 12, 15 of the extrusion 42. A carriage assembly 60 is disposed at least partially within the extrusion 42. The carriage assembly 60 has a complementary mounting surface 62 for attaching the VESA mount 50 to the carriage assembly 60. A first linear bearing assembly 64 is disposed between the carriage assembly 60 and the extrusion 42. Similarly, a second linear bearing assembly 65 is disposed between the carriage assembly 60 and the extrusion 42.

A resilient brake assembly 80 is disposed between the carriage assembly 60 and the extrusion 42 to add friction to resist unintended substantially longitudinal movement of the carriage 60 relative to the extrusion 42. Such unintended substantially longitudinal movement would be, for example, movement of the carriage 60 relative to the extrusion 42 when a user touches the touch screen to make a selection. Although touch screens are not necessarily activated by force, it is recognized that sometimes users apply force when making a selection on a touch screen. For example, a user may press on the touch screen with a force substantially normal to the display of the touch screen of about 1 Newton to about 10 Newtons. Substantially longitudinal movement of the carriage 60 relative to the extrusion 42 caused by such touching force would be unintended substantially longitudinal movement. It is to be understood that a longitudinal position of the display may be adjusted by applying a force greater than a breakaway force to the display parallel to the longitudinal axis 84. The breakaway force is defined as the magnitude of the force applied to the display in a direction parallel to the longitudinal axis 84. The breakaway force includes the static friction forces associated with the resilient brake assembly 80, the first linear bearing assembly 64, the second linear bearing assembly 65, and any other static friction forces. It is to be further understood that the breakaway force will be greater than the force required to continue moving the display after static friction is overcome. For example, a breakaway force from about 8 Newtons to about 18 Newtons may initiate movement of the display.

Figure 5:
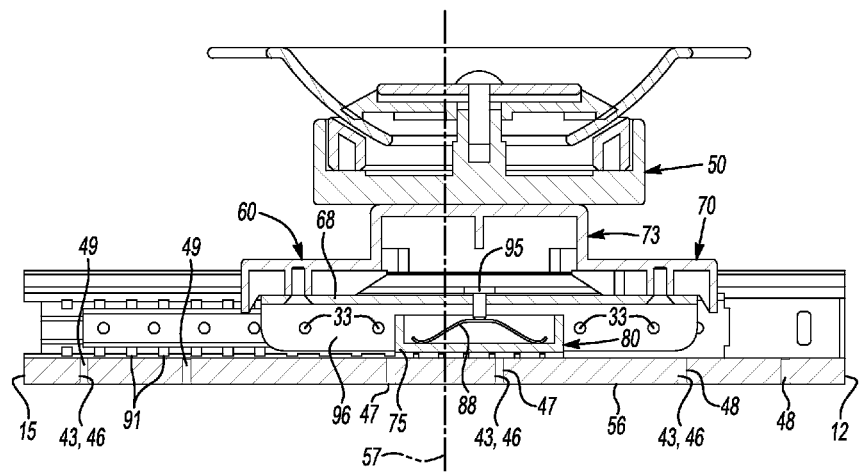
FIG. 5 is a top, partially cross-sectioned view of the example of the display arm assembly depicted in FIG. 4.
Figure 6:
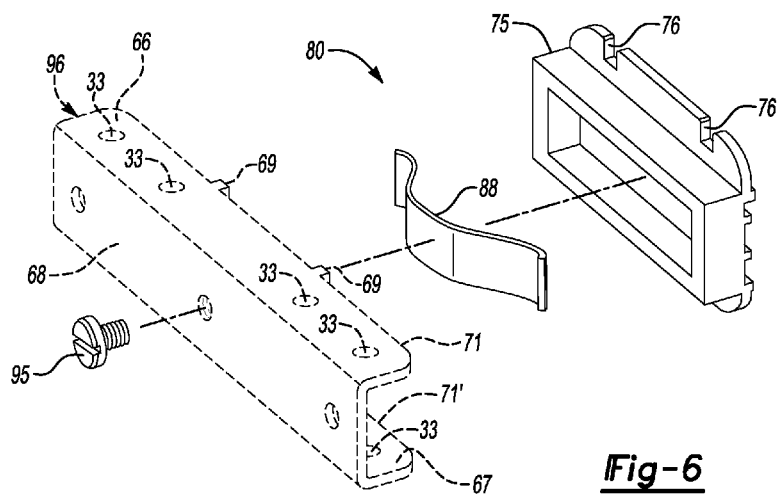
FIG. 6 is an exploded perspective view of an example of a brake assembly depicted in FIG. 5.

Details of an example of the resilient brake assembly 80 and the carriage assembly 60 are depicted in FIGS. 4 through 6 together. The carriage assembly 60 includes a c-channel 96 rigidly attached to the first linear bearing assembly 64 at a first flange 66. The c-channel 96 is also rigidly attached to the second linear bearing assembly 65 at a second flange 67. It is noted that neither the first nor the second linear bearing assemblies 64, 65 is shown in FIGS. 5 and 6. The second flange 67 is spaced from and parallel to the first flange 66. The c-channel 96 includes a web 68 disposed between the first flange 66 and the second flange 67, and alignment tabs 69 on a distal edge 71 of the first flange 66 and on a distal edge 71' of the second flange 67. Each of the distal edges 71, 71' faces opposite the web 68.

The carriage assembly 60 further includes a fascia 70 rigidly attached to the web 68 (see FIGS. 4 and 5). The fascia 70 has a cover 72 that substantially obscures visual observation of the c-channel 96 when the electronic video display mount 10 is fully assembled. A boss 73 is fixedly disposed on the cover 72. The boss 73 has the complementary mounting surface 62 formed thereon.

The resilient brake assembly 80 includes a brake pad 75 in straddling engagement with the substantially longitudinal brake rail 45. The brake pad 75 has slots 76 formed therein. The slots 76 are engaged with the alignment tabs 69 to substantially prevent relative motion between the brake assembly 80 and the carriage assembly 60 in a direction substantially parallel to the longitudinal axis 84.

The resilient brake assembly 80 further includes a resilient member 88 disposed between the brake pad 75 and the carriage assembly 60. The resilient member 88 exerts a biasing force on the brake pad 75 to cause the brake pad 75 to exert a normal force on the brake rail 45. Not being held to any theory, it is believed that a static friction force will resist initial relative movement between the brake pad 75 and the substantially longitudinal brake rail 45. According to Coulomb's approximation, $F_t \leq \mu F_n$ where $F_t$ is the force of friction exerted by each surface on the other. $F_t$ is parallel to the surface, in a direction opposite to the net applied force. $\mu$ is the coefficient of friction, which is an empirical property of the contacting materials. $F_n$ is the normal force exerted by each surface on the other, directed perpendicular (normal) to the surface.

As such, the static friction force may be adjusted by adjusting the biasing force exerted by the resilient member 88 between the brake pad 75 and the carriage assembly 60. In the example depicted in FIGS. 5 and 6, the resilient member 88 is a leaf-spring having a bow shape in a free state. A spring adjustment screw 95 is threaded through the web 68 of the c-channel 96 to impinge upon and adjustably compress or deflect the leaf-spring to cause the resilient member 88 to exert the biasing force between the brake pad 75 and the carriage assembly 60. The biasing force may be adjusted by turning the spring adjustment screw 95 to increase or decrease the displacement of the spring. It is to be understood that locking screw-threads, lock-washers, lock nuts, locking compounds, or chemical treatments may be used to resist inadvertent turning of the spring adjustment screw 95.

In the example depicted in FIG. 5, a first set 47 of the plurality of discrete sets of attachment holes 46 is located proximate a center 57 of the longest longitudinal wall 56 of the linear slide assembly 40. A second set 48 of the plurality of discrete sets of attachment holes 46 is located proximate the first end 12 of the longest longitudinal wall 56 of the linear slide assembly 40. A third set 49 of the plurality of discrete sets of attachment holes 46 is located proximate a second end 15 of the longest longitudinal wall 56 of the linear slide assembly 40 distal to the first end 12 of the largest longitudinal wall 56 of the linear slide assembly 40. It is to be understood that, as used herein, the location of a set of attachment holes is the centroid of the set of attachment holes.

Figure 7:
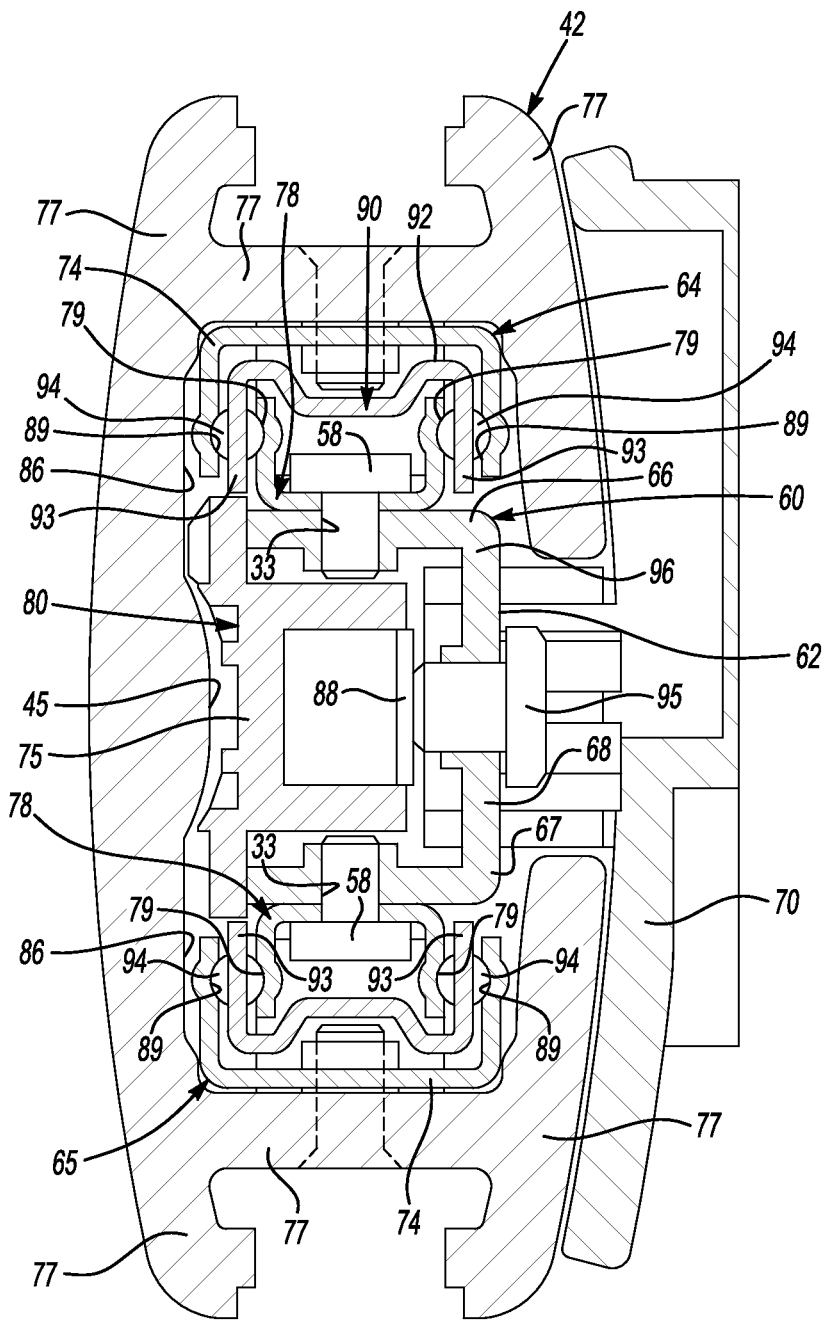
FIG. 7 is a side, partially cross-sectioned view of an example of the linear slide assembly depicted in FIG. 3.

FIG. 7 shows a side, cut-away view of an example of the linear slide assembly depicted in FIG. 3. Each of the first linear bearing assembly 64 and the second linear bearing assembly 65 has identical components. As such, a single part number may be used, and the one difference between the first linear bearing assembly 64 and the second linear bearing assembly 65 is their installed locations in the extrusion 42.

The linear bearing assemblies 64, 65 each include an inner race 78 rigidly attached to the c-channel 96. For example, linear bearing attachment screws 58 may be disposed through the inner race 78 and threadingly engaged with screw holes 33 in c-channel 96 to rigidly attach the linear bearing assemblies 64, 65 to the c-channel 96. The inner race 78 has two opposed external linear raceways 79. An outer race 74 is rigidly attached to the interior surface 86 of the extrusion 42. The outer race 74 has two opposed internal linear raceways 89. The linear bearing assemblies 64, 65 each further include a c-channel caged ball bearing assembly 90 including a c-channel cage 92. The c-channel cage 92 has a plurality of ball bearings 94 operatively disposed in apertures 91 defined in substantially equal quantities in opposed flanges 93 of the c-channel cage 92. The plurality of ball bearings 94 is operatively disposed between the internal linear raceways 89 and the external linear raceways 79.

An example of operation of the linear slide assembly 40 will now be described. A display is initially centered on the linear slide assembly 40. Referring to FIGS. 1, 5 and 7 together, a user manually applies a force of about 3 pounds to a first side 98 of a display 100 mounted on the electronic video display mount 10. The applied force is directed toward a second side 99 of the display 100 that faces opposite the first side 98, and the force overcomes the static friction in the linear slide assembly 40. The carriage assembly 60 translates toward the second side 99 along with the attached inner race 78. The plurality of ball bearings 94 maintain rolling contact with the external linear raceways 79 and the internal linear raceways 89 as the plurality of ball bearings move toward the second side 99. Since the raceways 79, 89 substantially do not slip in their rolling contact with the plurality of ball bearings 94, the inner races 78 translate about twice the distance that the plurality of ball bearings 94 rolls along the outer race 74. As such, the c-channel cage 92 also translates about the same distance as the plurality of ball bearings 94.

It is to be understood that the ranges provided herein include the stated range and any value or sub-range within the stated range. For example, a force ranging from about 10 Newtons to about 20 Newtons should be interpreted to include not only the explicitly recited amount limits of about 10 N to about 20 N, but also to include individual amounts, such as 10 N, 13.5 N, 15 N, 18 N, etc., and subranges, such as 10 N to 12 N, etc. Furthermore, when "about" is utilized to describe a value, this is meant to encompass minor variations (up to +/−5%) from the stated value except where specifically stated otherwise in this document.

It is further to be understood that, as used herein, the singular forms of the articles "a," "an," and "the" include plural references unless the content clearly indicates otherwise.

While several examples have been described in detail, it will be apparent to those skilled in the art that the disclosed examples may be modified. Therefore, the foregoing description is to be considered non-limiting.

What is claimed is:

1. An electronic video display mount, comprising:
   a substantially vertical mounting pole rigidly attached to a pole foot;
   a mounting collar releasably fixed to a mounting location selectively defined between a minimum distance and a maximum distance from the pole foot on the pole;
   a substantially horizontally mounted linear slide assembly fixedly attached to the mounting collar at an attachment interface; and
   a Video Electronics Standards Association (VESA) mount pivotally attached to the linear slide assembly;
   wherein the linear slide assembly further comprises:
      an extrusion having walls substantially defined by a cross-section projected along a longitudinal axis, an interior cavity defined by the walls, threaded holes for attachment to the mounting collar, a substantially longitudinal axial slot defined in the walls parallel to the longitudinal axis opposite the threaded holes, and a substantially longitudinal brake rail fixedly disposed on an interior surface of the extrusion;
      a carriage assembly disposed at least partially within the extrusion, the carriage assembly having a complementary mounting surface for attaching the VESA mount to the carriage assembly;
      a first linear bearing assembly disposed between the carriage assembly and the extrusion;
      a second linear bearing assembly disposed between the carriage assembly and the extrusion; and
      a resilient brake assembly disposed between the carriage assembly and the extrusion to add friction to resist unintended substantially longitudinal movement of the carriage relative to the extrusion.

2. The electronic video display mount as defined in claim 1 wherein the carriage assembly further comprises:
   a c-channel rigidly attached to the first linear bearing assembly at a first flange, and to the second linear bearing assembly at a second flange, the c-channel including a web disposed between the first flange and the second flange and alignment tabs on a distal edge of the first flange and on a distal edge of the second flange, each of the distal edges facing opposite the web; and
   a fascia rigidly attached to the web, the fascia having a cover that substantially obscures visual observation of the c-channel, and a boss fixedly disposed on the cover, the boss having the complementary mounting surface formed thereon.

3. The electronic video display mount as defined in claim 1 wherein the resilient brake assembly further comprises:
   a brake pad in straddling engagement with the substantially longitudinal brake rail, the brake pad having slots formed therein, the slots being engaged with the alignment tabs to substantially prevent relative motion between the brake assembly and the carriage assembly in a direction substantially parallel to the longitudinal axis;
   a resilient member disposed between the brake pad and the carriage assembly, the resilient member to exert a biasing force on the brake pad to cause the brake pad to exert a normal force on the brake rail; and
   a spring adjustment screw threaded through a portion of the carriage assembly to impinge upon and adjustably deflect the resilient member to increase or decrease the biasing force.

4. The electronic video display mount as defined in claim 1 wherein each of the first linear bearing assembly and the second linear bearing assembly further comprises:
   an inner race rigidly attached to the c-channel, the inner race having two opposed external linear raceways;
   an outer race rigidly attached to the interior surface of the extrusion, the outer race having two opposed internal linear raceways; and
   a c-channel caged ball bearing assembly including a c-channel cage having a plurality of ball bearings operatively disposed in apertures defined in substantially equal quantities in opposed flanges of the c-channel cage, the plurality of ball bearings operatively disposed between the internal linear raceways and the external linear raceways.

5. The electronic video display mount as defined in claim 1 wherein the attachment interface is selectable from a plurality of discrete sets of attachment holes.

6. The electronic video display mount as defined in claim 5 wherein a first set of the plurality of discrete sets of attachment holes is located proximate a center of a longest longitudinal wall of the linear slide assembly, a second set of the plurality of discrete sets of attachment holes is located proximate a first end of the longest longitudinal wall of the linear slide assembly, and a third set of the plurality of discrete sets of attachment holes is located proximate a second end of the longest longitudinal wall of the linear slide assembly that is distal to the first end of the largest longitudinal wall of the linear slide assembly.

7. The electronic video display mount as defined in claim 1 wherein the mounting collar is releasably fixed by a screw to the mounting location.

8. The electronic video display mount as defined in claim 7 wherein the screw includes a knob.

9. The electronic video display mount as defined in claim 7 wherein the mounting collar includes an annular bushing to selectively and releasably radially constrict a band disposed between the annular bushing and the substantially vertical mounting pole.

10. A method of mounting an electronic video display, comprising:
   rigidly attaching a substantially vertical mounting pole to a pole foot;
   releasably fixing a mounting collar to a mounting location selectively defined between a minimum distance and a maximum distance from the pole foot on the pole;
   fixedly attaching a substantially horizontally mounted linear slide assembly to the mounting collar at an attachment interface; and
   pivotally attaching a Video Electronics Standards Association (VESA) mount to the linear slide assembly;
   wherein the linear slide assembly comprises:
      an extrusion having walls substantially defined by a cross-section projected along a longitudinal axis, an interior cavity defined by the walls, threaded holes for attachment to the mounting collar, a substantially longitudinal axial slot defined in the walls parallel to the longitudinal axis opposite the threaded holes, and a substantially longitudinal brake rail fixedly disposed on an interior surface of the extrusion;
      a carriage assembly disposed at least partially within the extrusion, the carriage assembly having a complementary mounting surface for attaching the VESA mount to the carriage assembly;
      a first linear bearing assembly disposed between the carriage assembly and the extrusion;
      a second linear bearing assembly disposed between the carriage assembly and the extrusion; and
      a resilient brake assembly disposed between the carriage assembly and the extrusion to add friction to resist unintended substantially longitudinal movement of the carriage relative to the extrusion.

11. The method as defined in claim 10 wherein the carriage assembly further comprises:
   a c-channel rigidly attached to the first linear bearing assembly at a first flange, and the second linear bearing assembly at a second flange, the c-channel including a web disposed between the first flange and the second flange and alignment tabs on a distal edge of the first flange and on a distal edge of the second flange, each of the distal edges facing opposite the web; and
   a fascia rigidly attached to the web, the fascia having a cover that substantially obscures visual observation of the c-channel, and a boss fixedly disposed on the cover, the boss having the complementary mounting surface formed thereon.

12. The method as defined in claim 10 wherein the resilient brake assembly further comprises:
   a brake pad in straddling engagement with the substantially longitudinal brake rail, the brake pad having slots formed therein, the slots being engaged with the alignment tabs to substantially preventing relative motion between the brake assembly and the carriage assembly in a longitudinal direction; and
   a resilient member disposed between the brake pad and the carriage assembly, the resilient member to exert a biasing force on the brake pad to cause the brake pad to exert a normal force on the brake rail.

13. The method as defined in claim 10 wherein each of the first linear bearing assembly and the second linear bearing assembly further comprises:
   an inner race rigidly attached to the c-channel, the inner race having two opposed external linear raceways;
   an outer race rigidly attached to the interior surface of the extrusion, the outer race having two opposed internal linear raceways; and
   a c-channel caged ball bearing assembly including a c-channel cage having a plurality of ball bearings operatively disposed in apertures defined in substantially equal quantities in opposed flanges of the c-channel cage, the plurality of ball bearings operatively disposed between the internal linear raceways and the external linear raceways.

14. The method as defined in claim 10, further comprising selecting the attachment interface from a plurality of discrete sets of attachment holes.

15. The method as defined in claim 14 wherein a first set of the plurality of discrete sets of attachment holes is located proximate a center of a longest longitudinal wall of the linear slide assembly, a second set of the plurality of discrete sets of attachment holes is located proximate a first end of the longest longitudinal wall of the linear slide assembly, and a third set of the plurality of discrete sets of attachment holes is located proximate a second end of the longest longitudinal wall of the linear slide assembly that is distal to the first end of the largest longitudinal wall of the linear slide assembly.

16. The method as defined in claim 10, further comprising releasably fixing the mounting collar to the mounting location by a screw.

17. The method as defined in claim 16 wherein the screw includes a knob.

18. The method as defined in claim 16 wherein the mounting collar includes an annular bushing to selectively and releasably radially constrict a band disposed between the annular bushing and the substantially vertical mounting pole.

* * * * *